United States Patent [19]
Nicolson

[11] 3,760,414
[45] Sept. 18, 1973

[54] BASE BAND VEHICLE SAFETY APPARATUS
[75] Inventor: Alexander M. Nicolson, Concord, Mass.
[73] Assignee: Sperry Rand Corporation, New York, N.Y.
[22] Filed: Oct. 22, 1971
[21] Appl. No.: 191,675

[52] U.S. Cl. ........... 343/6.5 R, 343/7 A, 343/7 ED, 343/112 CA
[51] Int. Cl. .............................................. G01s 9/56
[58] Field of Search .............. 343/7 ED, 7 A, 6.5 R, 343/6.5 LC, 112 LA, 6.8 LC

[56] References Cited
UNITED STATES PATENTS

| | | | |
|---|---|---|---|
| 3,448,822 | 6/1969 | Lalone et al. .................... 343/7 ED |
| 3,187,327 | 6/1965 | Schneider et al. ............... 343/6.5 R |
| 3,530,467 | 9/1970 | Attwood et al. ........... 343/6.5 LC X |
| 3,172,107 | 3/1965 | Morris ........................... 343/6.5 R X |
| 3,341,845 | 9/1967 | Deman ..................... 343/6.8 LC X |
| 3,173,137 | 3/1965 | Byrne ............................... 343/6.5 R |
| 3,659,203 | 6/1970 | Ross et al. ...................... 343/701 X |

Primary Examiner—Malcolm F. Hubler
Attorney—Howard P. Terry

[57] ABSTRACT

A vehicle safety apparatus includes directive radio means for the detection of an impending collision with another vehicle and for actuation of restraining or other safety devices for protecting occupants of both vehicles if a crash event actually occurs. Base-band radio pulse transmission and reception devices provide forward and rearward sensing of the relative locations of cooperating vehicles, each vehicle being equipped with a pair of similar and cooperating radio detector systems. In addition to the cooperative mode of operation, the forward viewing sensors provide fail-safe operation where an interrogated rearward viewing system does not respond, and otherwise provide operation with passively reflecting objects of various kinds which represent hazards to the vehicle or its passengers.

20 Claims, 7 Drawing Figures

PATENTED SEP 18 1973 3,760,414

SHEET 1 OF 3

BASE BAND VEHICLE SAFETY APPARATUS

BACKGROUND OF THE INVENTION

1. Field of the Invention

The invention pertains to safety apparatus for the detection of an impending vehicular collision and for the automatic operation of warning or protective devices and more particularly concerns a cooperative system of forward viewing vehicle-mounted radio distance sensors adapted to cooperate with similar vehicle-mounted rearward viewing sensors that provide actively augmented reflected signals for generating alarm or protective-device-actuating signals in both of a pair of interacting vehicles. Further, the invention is adapted to protect a following vehicle in the event of failure of the rearward viewing sensor of the vehicle being followed and to protect a vehicle from collision with non-vehicular objects.

2. Description of the Prior Art

In the prior art, both pulse and continuous wave types of cooperative and other radio object detection systems have been considered as sensors for warning of the potentiality of vehicle collisions or for operating certain devices tending to diminish the potential of vehicular collisions, such as between a following car and an automobile in front of it. As to cooperative and other systems proposing the use of pulsed radio transmissions, relatively high power is radiated and the use of a wide portion of the electromagnetic spectrum is demanded, thus rendering a considerable part of the high frequency spectrum useless for communication or other desirable purposes. Such prior art systems may also block cooperative or other receivers for a considerable time, thus rendering them useless for sensing obstacles at near ranges. Continuous wave systems have been suggested for the collision avoidance or detection function; but they, too, have many of the disadvantages of pulse systems in short range measurement, as well as having cyclic range ambiguity characteristics. Accordingly, there is not known in the published literature a radio frequency collision detector or sensor system which may be operated with full success over near-by object distances in a wave band already allotted to conventional receivers in the same geographical vicinity. More particularly, there is not known in the published literature a radio frequency collision detector or sensor system of the just described type which can operate at very low or legal power levels in such wave bands without it itself being the victim of intolerable interference. Furthermore, there is not known in the published literature a radio frequency collision detector or sensor system such as described in the foregoing and also capable of transmission and reception of signals having an extremely wide frequency spectrum without interfering with the transmission of ordinary radio communication signals.

In consequence of these and other serious deficiencies of the prior art, those seeking to devise means for protecting vehicle passengers in actual collisions between vehicles or between a vehicle and another object have sought to use crude mechanical sensors in the form of decelerometer-like devices which in theory operate only after the collision impact occurs; i.e., they are not capable of anticipating the crash event. For example, one such mechanical sensor device includes a mass which is biased to an inactive position against a stop by plural spring contact members. During an actual collision, the mass is designed to move, overcoming the spring bias and activating a safety device such as a passenger restraining gas bag. Because such sensors lack the capability of anticipating a crash event, they are actuated, where they do perform reliably, always after the passenger's body has started to move toward the vehicle dash board; i.e., the passenger is struck by the gas bag moving toward him relatively faster than the dash board of the vehicle.

In this and in similar mechanical sensors which have been proposed for safety device actuation, the apparatus is presumed to be always in condition to operate satisfactorily, while in fact it may have remained in a dormant, untended, and untested condition for months or even years. Fail-safe and operability monitoring instrumentalities are not present and, more important, are generally incapable of application to such devices, since such decelerometer devices are designed as strictly one-shot mechanical devices and do not readily accommodate themselves by nature to testing. While these prior art deceleration sensing devices are theoretically devised to be actuated at a particular impact level, there is little hope that they can demonstrate accurately repeatable characteristics in actual practice.

SUMMARY OF THE INVENTION

The present invention relates to vehicular safety systems that include radio means for the detection of a potential collision of a protected vehicle with a cooperating or other vehicle or other object immediately prior to possible impact and for actuation of warning, restraining, or other safety devices also just prior to the possible collision for the protection of occupants of the vehicle before the crash event actually occurs. The radio sensor employs an integrated transmitter-receiver arrangement transmitting base band or very short duration electromagnetic pulse transmission and reception devices with a range sensing means adapted to sense relative speeds of the vehicles involved in the potential crash. These signals are employed when simultaneously present in cooperating vehicles to activate passenger restraining or other protective devices in both vehicles in anticipation of the actual collision event. The radio object or collision sensor system is so constructed and arranged as to afford sensing of near-range vehicles or other objects without interference with the operation of conventional radio communication systems and, in turn, without being substantially affected in normal operation by the radiations of other radio frequency systems or by ambient electrical noise signals.

The unitary collision sensor transmitter-receiver arrangements appropriate for employment in the novel collision sensor system utilize a non-dispersive transmission line system for generation of base-band or sub-nanosecond pulses of electromagnetic energy and for their radiation into space. The transmission line system functions as a non-dispersive radiator, launching the sub-nanosecond impulses into space with substantially no distortion. Such base-band pulses have an extremely wide energy spectrum; while the total energy content of any given transmitted base-band pulse may be considerable, the few spectral lines falling within the relatively narrow pass band of a conventional receiver are of low amplitude and have no effect thereon.

The radio object or collision sensor transmitter-receiver suitable for detecting and utilizing such short base-band electromagnetic pulses also employs a dispersionless transmission line receiver antenna, with a utilization circuit cooperating therewith for instantaneously detecting substantially the total energy of the received base-band pulse and for supplying a corresponding output suitable for processing in alarm or actuator circuits. The receiver antenna system supplies substantially the total energy of each undistorted received base-band pulse directly to the receiver circuit; thus, the receiver circuit is adapted to operate successfully with pulse signals having a very wide spectral extent. Further, reception may operate with base-band pulse signals having spectral components each of such low individual energy content as to escape detection by conventional relatively narrow band receivers. The total amplitude in each base-band pulse may, however, be relatively larger than the level of noises or other interfering pulses or signals in the vicinity of the novel receiver. Thus, by appropriately adjusting the transmission output level and the reception sensitivity or threshold, base-band signals not affecting other receivers are readily transmitted, received, and detected without the collision sensor system being affected in any substantial degree by other radio energy transmissions. The major processing of the echo signals is accomplished, according to the invention, by simple base-band signal circuits, thus avoiding the need for signal frequency conversion and the problems associated with alignment and operation of conventional radio and intermediate frequency amplifiers.

The novel base-band collision sensor system operates with a very low energy consumption, so that power supply cost and size are minimized. Furthermore, with such low power operation, inexpensive and ordinary components find long life use throughout the sensor. All component elements are of very simple nature and otherwise inexpensive of installation, maintenance, and operation.

DESCRIPTION OF THE PREFERRED EMBODIMENTS

Figure 1:
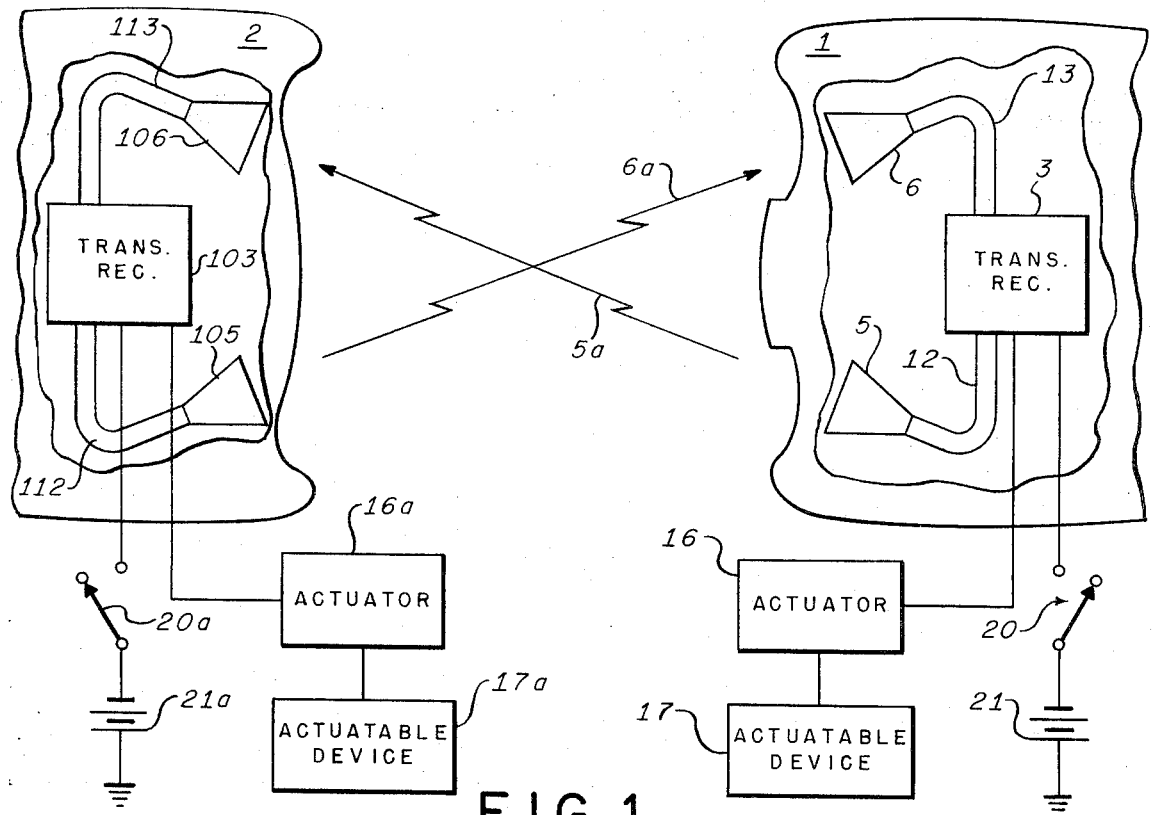
FIG. 1 is a diagram of a preferred arrangement of the invention showing a plan view in partial section of portions of first and following vehicles equipped with the invention.

FIG. 1 illustrates the front of a vehicle or car 1 in a position proximate the rear of a second vehicle or car 2. It will be understood that both cars 1 and 2 may be moving, and otherwise that relative motion between the two cars may cause car 1 to move toward car 2, thus decreasing the distance between the two vehicles. Should the relative speeds differ and that speed difference be maintained, a contact between the two vehicles is inevitable. If the maintained relative speed is above a nominal value, collision damage to the cars and their occupants is a probable consequence. It will be recognized that car 2 may be a stationary vehicle or may be a normally stationary object such as a metal highway barrier or wall.

According to the invention, impending collisions of the above kind with vehicles or other objects are detected for the purpose of operating alarms or safety devices of well known types for the reduction of damage to one or both vehicles and of injuries to vehicle occupants. For this purpose, there is provided at least within car 1 a base-band pulse transmitter-receiver 3 including a cooperating echo reception and detector system of a novel type adapted to employ subnanosecond duration or base-band pulses of electromagnetic energy. A transmitter antenna 5 may be located at the left side of car 1 behind a dielectric grille at the front of the car, with a radiation pattern directed in a generally forward manner toward any obstacle to forward motion of car 1 that might be present, such as car 2. A receiver antenna 6 is similarly mounted at the right side of car 1 behind the dielectric grille, being directed so that its receptivity pattern is arranged to collect signals passively or actively reflected from an obstacle, such as car 2. It will be apparent to those skilled in the art that the arrow-headed lines 5a and 6a are intended in a general way to represent paths taken by radiation transmitted by antenna 5, reflected at a representative passive or active reflecting element of car 2, and received by receiver antenna 6, or the signals themselves. Antennas 5 and 6 preferably have respective radiation and receptivity patterns sufficiently wide for echo energy to be collected mainly from the rear or other part of car 2, but not by a direct path from antenna 5 to antenna 6.

The transmitter-receiver system 3 utilizes a short base-band transmitter or base-band pulse generator to excite the directive radiator antenna 5, the transmitter pulse generator being connected to radiator or antenna 5 through an interconnecting transmission line system 12. The transmitter-receiver 3 generator may be of a recent general type capable of producing single positive or negative going pulses or regular or other trains of pulses, each such pulse having a very short duration, and for radiating such pulses from a suitable antenna 5. One device for producing such short base-band pulses is disclosed by G.F.Ross in the U.S. Pat. No. 3,402,370 for a "Pulse Generator," issued Nov. 30, 1965.

The performance of such transmitters in efficiently launching base-band pulses into space may be greatly improved by the use of the general kind of radiating antenna system employed by G.F.Ross and D.Lamensdorf in the U.S. Pat. application Ser. No. 46,079 for a "Balanced Radiation System," filed June 15, 1970, now U.S. Pat. 3,659,203, and assigned to the Sperry Rand Corporation. The latter device, for instance, employs an electrically smooth, constant impedance, transmission line system for propagating transverse electromagnetic or TEM mode waves. The transmission line system of the Ross et al patent application is employed for the cooperative cyclic storage of energy on the transmission line and for its cyclic release by propagation along the transmission line and radiation at the end of a section of the transmission line formed as a directive antenna.

The antenna of the above-mentioned Ross et al. patent application is of a type particularly suitable for use as antennas 5 and 6, since these antennas require a wide instantaneous band width, so that they may radiate or receive very sharp impulse-like signals with low distortion. Further, antennas 5 and 6 need an energy focusing characteristic such that energy radiated or received in a predetermined direction is maximized, as is generally desirable in object detection systems.

The radiated base-band signal propagates in free space toward the reflecting target, such as the rear of car 2, and is reflected by the target surface or by an active reflector to return toward receiver antenna 6. The echo wave is delayed with respect to the transmitted wave by a time which is proportional to twice the distance or range to the actively or passively reflecting target 2. The receiver antenna 6 may have a construction and properties generally similar to those of the transmitter antenna 5 in that it also employs a similar electrically smooth, constant impedance transmission line system for propagating TEM mode electromagnetic waves, as will be explained in connection with FIG. 3, so that collected echo signals of very short duration propagate in the receiver antenna with substantially no distortion. It will be understood that the transmission lines 12 and 13 connected to the respective antenna elements are selected for their ability to propagate baseband signals with substantially no distortion. While dual parallel conductor lines or coaxial transmission lines are preferably employed, the selected energy transmission medium should be devoid of impedance discontinuities and so constructed and arranged as to support TEM mode propagation of the high frequency energy, since it is the TEM transmission line mode that is the substantially non-dispersive mode.

Any echo signal collected by antenna 6 is coupled into transmission line 13 and fed to the transmitter-receiver system 3 for processing. Should the internal processing circuits of transmitter-receiver system 3 react to reflected signals 6a when the range between cars 1 and 2 is rapidly decreasing, system 3 may produce an output for operation of an actuator 16 for operation of actuatable device 17, as will be further explained. As will also be explained, actuator 16 may be any one of a variety of servo or actuator devices, including latchable or other switches or relays for operating alarms of other known devices for positioning or operating any one of a variety of actuatable devices 17 in a well known manner. Transmitter-receiver 3 will have first been put into operation by the closing of a switch 20 which may be part of a manually operated engine ignition or other switch, for supplying power to device 3 from power source 21.

Figure 2:
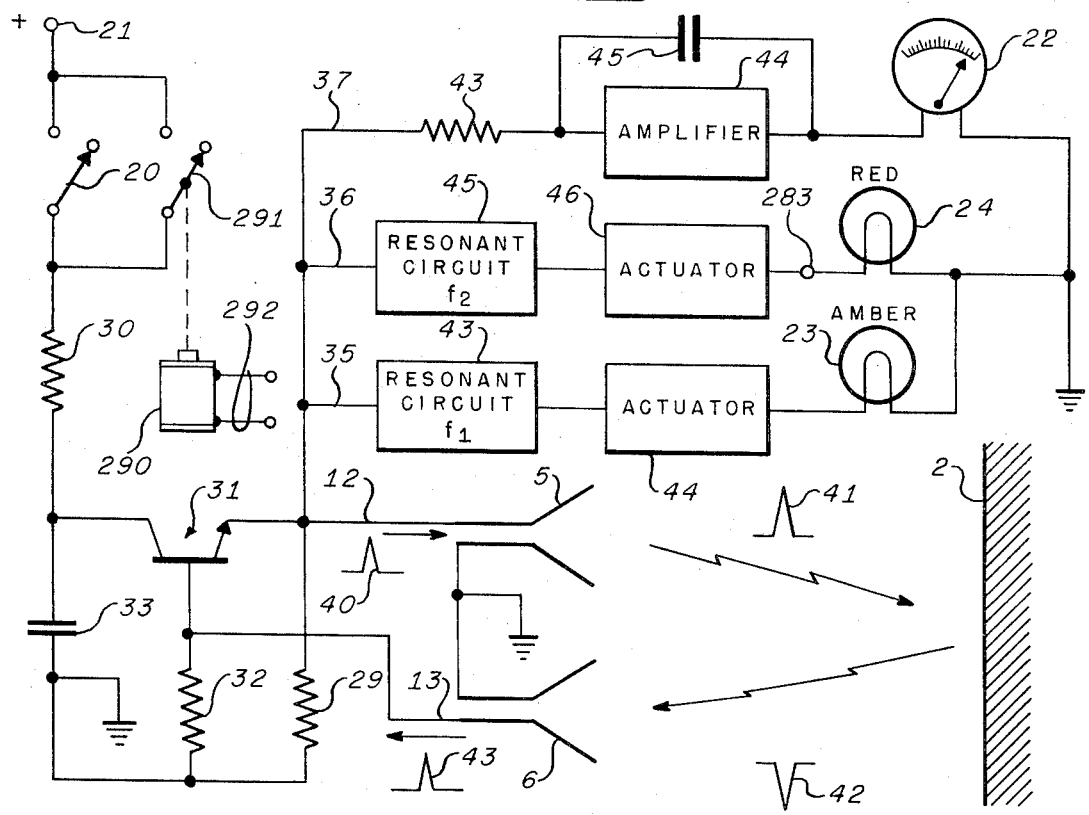
FIG. 2 is a circuit diagram of the novel transmitter-receiver sensors of FIG. 1 showing electrical components and their wiring interconnections.

The transmitter-receiver system of FIG. 1 is shown in detail in FIG. 2, the circuit of FIG. 2 being activated by supplying power from voltage source 21 by the closure of switch 20. Such an event supplies power through resistor 30 to the collector electrode of an avalanche transistor 31, which may be of the 2N706 kind, and whose base electrode is connected through resistor 32 to ground. Capacitor 33, connected between ground and the collector electrode of transistor 31, may merely represent the stray capacitance of the transistor collector electrode circuit or may be partly real. The emitter electrode of transistor 31 is coupled through resistor 29 to ground and also serves as a primary circuit output element. A transmitter antenna 5 of the above mentioned type is coupled by transmission line 12 to the emitter electrode. The similar receiver antenna 6 is coupled via transmission line 13 to the base electrode of transistor 31. Output indicator or control circuit leads 35, 36, and 37 are coupled to the emitter electrode of transistor 31. In one form of the device, resistor 30 was about 3,000 ohms, resistor 32 was about 50 ohms, resistor 29 was about 1,000 ohms, and the voltage from supply 21 was about +75 volts. The stray capacitance represented by capacitor 33 was about 3 picofarads.

When sensing presence of an active or passive reflector 2, the high frequency avalanche transistor 31 repetitively discharges the stray capacitance 33 of the collector electrode circuit of transistor 31, generating positive subnanosecond pulses 40 at the emitter electrode of transistor 31. While capacitor 33 is re-charging, pulse 40 propagates in the TEM mode through transmission line 12 and is launched into space as pulse 41 with essentially no deterioration in shape toward reflector 2. Since the passive reflection surface of car or reflector 2 has a characteristic impedance generally less than the characteristic impedance of free space, the pulse 42 reflected by reflector 2 will generally be inverted or negative-going.

As noted previously, antennas 5 and 6 are of the general kind disclosed in pending U.S. Pat. application Ser. No. 46,079 and elsewhere. For receiving the pulse 42, the reception antenna 6 has one side connected to ground in a sense opposite to the connection for transmitter antenna 5, as is seen in FIG. 2; accordingly, the pulse 42 is returned along TEM transmission line 13 toward the base of transistor 31 in a positive-going sense as pulse 43.

The collector circuit time constant depends upon the value of $R_c$ of resistor 30 and on the value $C_s$ of the stray capacitance represented by capacitor 33; i.e., upon the value of the product $R_c C_s$. In the invention, the quantity $R_c C_s$ is chosen so that at the moment the received pulse 43 arrives at transistor 31, the current through the collector-base circuit of transistor 31 has risen to an amplitude just slighty less than the holding current value for transistor 31. The holding current amplitude is adjusted by appropriate choice of the value of resistor 32. The additional positive impulse in the form of echo pulse 43 at the base of transistor 31 is sufficient to cause avalanche transistor 31 readily to break down generating a new output subnano-second duration or base-band pulse 40 at the emitter of transistor 31, and causing the cycle of operation to be repeated.

It will also be understood that the transmitter-receiver circuit 3 of FIGS. 1 and 2 may readily be adjusted to operate in a stand-by mode. If there is no reflector 2 present to return signal 6a to receiver antenna 6, or if the reflected signal collected by receiver antenna 6 is not otherwise of sufficient amplitude, capacitor 33 will continue to charge. The charge across capacitor 33 will eventually rise until the current diverted through the collector-to-base junction of transistor 31 exceeds the holding current of transistor 31. After breakdown and discharge of capacitor 33, capacitor 33 will charge again through resistor 30 and the cycle will repeat at a relatively low repetition frequency. In the meantime, should a pulse signal 6a of sufficient amplitude be reflected actively or passively into receiver antenna 6, the transistor 31 will break down upon receipt thereof, and the system will cycle at a relatively higher repetition frequency directly proportional to the total path length from transistor 31 to the reflector 2 and back again to transistor 31, the repetition rate now being inversely proportional to the path length and therefore being a measure of the separation between cars 1 and 2.

The apparatus of FIG. 2 may be equipped with one or more indicators and actuators such as elements 22, 23, and 24. The indicator 22, for instance, is a simple direct current meter which is calibrated in range; the average unidirectional voltage at the emitter of transistor 31 is measured, since the conductor 37 is coupled to that emitter. The emitter voltage is coupled through resistor 43 to an integrating amplifier 44 supplied with an integrating capacitor 45. The output of the integrator system is supplied to meter 22. As the repetition rate of transmitter-receiver system 3 increases; i.e., the range to the object decreases, the average unidirectional voltage level increases, because succeeding pulses 40 in the train of transmitter pulses have substantially identical shape.

Alternatively, the respective amber and red warning lights 23 and 24 or other conventional visual or audible warning elements may be employed. For example, the train of pulses 40 may be supplied through a circuit 43 tuned to frequency $f_1$ for operating actuator 44 when the repetition frequency passes through frequency $f_1$. Actuator 44 may be of the conventional type responding to any such event by operating a relay, latching or otherwise, which turns on the amber lamp 23, either continuously or in a flashing manner. Actuator 44 and lamp or horn 23 may evidently be reset in any conventional manner, and have the function of warning the vehicle operator that his vehicle is too close to an object such as the rear of car 2, in order to permit him to take the necessary remedial steps. Alternatively, actuator 44 may be the type of device which atuomatically applies the vehicle brakes should the operator fail to take remedial action. While automatic actuation of brakes will not necessarily diminish the actual chance of collision, at least some of the vehicle energy will be dissipated, reducing consequent probabilities of destruction of life and property. The train of pulses 40 may also be supplied to a second resonant circuit 45 tuned to a frequency $f_2$ higher than frequency $f_1$. The presence of a signal of frequency $f_2$ causes operation of the second actuator 46, which actuator 46 may be similar to actuator 44 and may be of the conventional type responding to the presence of the signal of frequency $f_2$ by operating a relay, latching or otherwise, which turns on the red lamp 24. The actuator 44 operates lamp 24 to warn the vehicle operator that a collision with car 2 is certain, for instance. Actuator 45 may be employed to operate a safety device for protecting the vehicle operator or his passengers, as will be discussed.

It will be noted that transmission and reception of short-duration or base-band pulses from their source, such as from the base-band pulse generator of transmitter-receiver 3, is through a transmission line medium 12, 13 that preferably operates substantially solely in the TEM mode, and that propagation modes that permit dispersion of pulses such as subnanosecond or base-band pulses are not used. Thus, the full energy of any received echo or other base-band pulses originally transmitted by antenna 5 is effectively directed by receiver antenna 6 for processing by the circuit associated with transistor 31.

Figure 3:
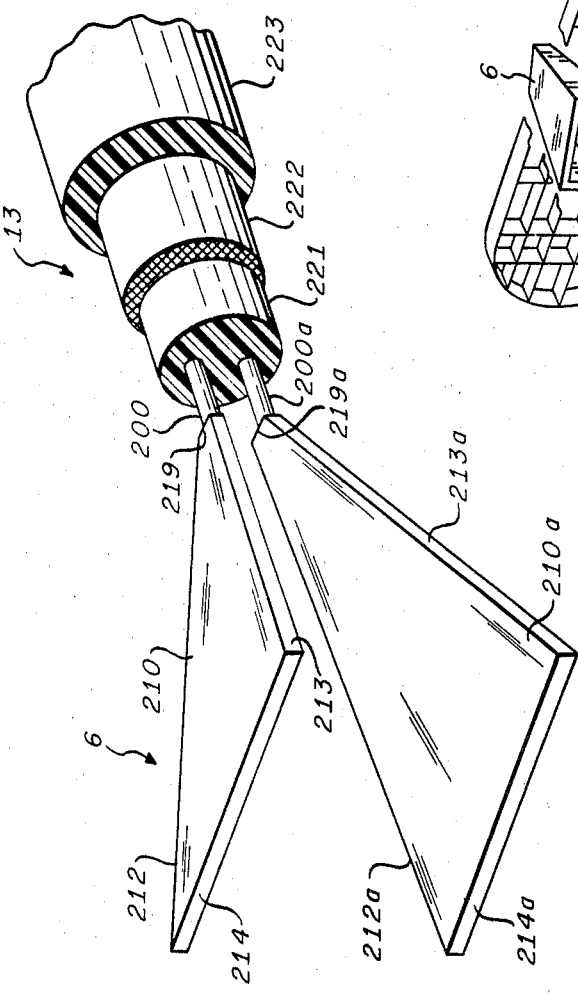
FIG. 3 is a perspective view partly in section of antenna and transmission line systems used in the apparatus of FIGS. 1 and 2.
Figure 4:
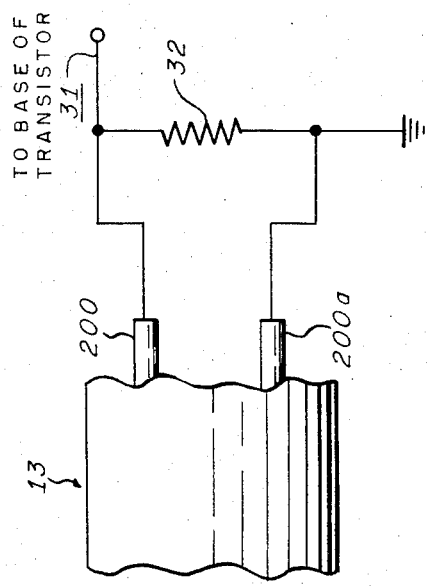
FIG. 4 is a view of a portion of the transmission line of FIG. 3.

The receiver antenna 6 and its associated transmission line 13 may take the form shown in FIGS. 3 and 4, where antenna 6 comprises a structure having mirror image symmetry about a median plane at right angles to the direction of the vector of the electric field propagating into antenna 6. The same type of symmetry resides in the cooperating transmission line 13 which comprises parallel wire transmission line conductors 200 and 200a; conductors 200 and 200a are spaced wire conductors constructed of a material capable of conducting high frequency currents with substantially no ohmic loss. Furthermore, conductors 200 and 200a are so constructed and arranged as to support TEM mode propagation of high frequency energy, with the major portion of the electric field lying between conductors 200 and 200a.

The TEM receiver antenna 6, for example, preferably consists of a pair of flared, flat, electrically conducting planar members 210 and 210a. Members 210 and 210a are, for example, generally triangular in shape, member 210 being bounded by flared edges 212 and 213 and a frontal aperture edge 214. Similarly, member 210a is bounded by flaring edges 212a and 213a and a frontal aperture edge 214a. Each of triangular members 210 and 210a is slightly truncated at its apex, the truncations 219 and 219a being so constructed and arranged that conductor 200 is smoothly joined without overlap at truncation 219 to antenna member 210. Likewise, conductor 200a is smoothly joined without overlap at truncation 219a to antenna member 210a. It is to be understood that the respective junctions at truncations 219 and 219a are formed using available techniques for minimizing impedance discontinuities corresponding to the junctions.

It is also to be understood that the flared members 210 and 210a of antenna 6 are constructed of material highly conductive for high frequency currents. It is further apparent that the interior volume of antenna 6 may be filled at least in part with an air foamed or other dielectric material exhibiting low dielectric loss in the presence of high frequency fields, such material acting to support conductor 210 in fixed relation to conductor 210a.

The planar collector elements 210 and 210a of receiver antenna 6 are coupled in impedance matched relation to the two wire transmission line 13. Transmission line 13 is arranged to have the same impedance as the transmission line comprising antenna elements 210 and 210a. Transmission line 13 may have its parallel wire conductors 200 and 200a molded into a dielectric enclosing element 221 for the purpose of accurately determining the separation of conductors 200 and 200a so that transmission line 13 has a constant impedance along its length. Dielectric element 221 may be surrounded, in turn, by a braided or other conductive shield 222 which may be grounded at any convenient location. Shield 222 may, in turn, be surrounded by a protective plastic cover element 223 of the well known type.

As indicated in FIG. 4, the end of transmission line 13 of FIG. 3 which feeds echo signals to transistor 31 is preferably of construction similar to the dispersionless dual conductor transmission line 13 of FIG. 3. Transmission line 13 is then readily coupled across resistor 32 which is in circuit with transistor 31.

Figure 5:
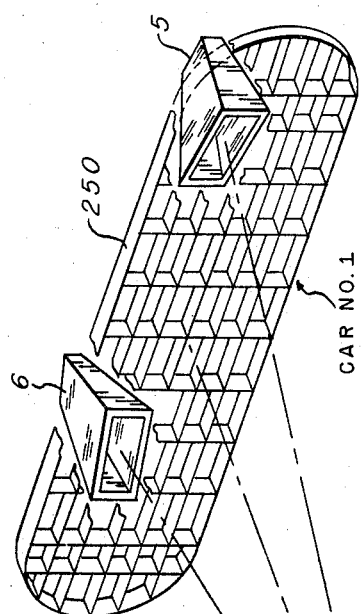
FIG. 5 is a perspective view showing how antennas like that of FIG. 3 are used behind an automobile frontal grille.

The cooperating antenna 6 and transmission line system of the form shown in FIGS. 3 and 4 is a preferred receiver antenna system, in part, because desired TEM mode propagation therein is readily established. The TEM propagation mode is preferred, since it is the substantially non-dispersive propagation mode and its use therefore minimizes distortion of the propagating subnanosecond pulse signal to be received by antenna 6. The simple dual conductor transmission line structure also permits construction of the antenna-transmission line configuration with minimum impedance discontinuities. The characteristic impedance of antenna 6 is constant along its length and may thus be readily made equal to that of transmission line 13. By maintaining a continuously constant characteristic impedance and TEM propagation along the structure including antennas 5 and 6 and transmission lines 12 and 13, frequency sensitive reflections are prevented therein and frequency dispersion is eliminated. A received subnanosecond impulse therefore flows through antenna 6, for example, into transmission line 13 without substantial reflection and without substantial degradation of its shape or amplitude. Since the full energy or amplitude of a low-level subnanosecond base-band pulse is thus delivered to the transistor 31 by the antenna-transmission line system, it is seen that the receiver detector can be sensitive to extremely short low-level base-band pulses having an extremely wide spectral content, any component of which would be incapable of detection using conventional wide pulse reception techniques. Antenna 6, along with transmitter antenna 5, will generally be mounted with respect to a protected vehicle as indicated in FIGS. 1 and 5. In FIG. 5, a representative installation is shown wherein antennas 5 and 6 are located just behind a dielectric or other substantially open grille 250 at the front of the protected vehicle. Other frontal or other locations will readily be found to be suitable.

Figure 6:
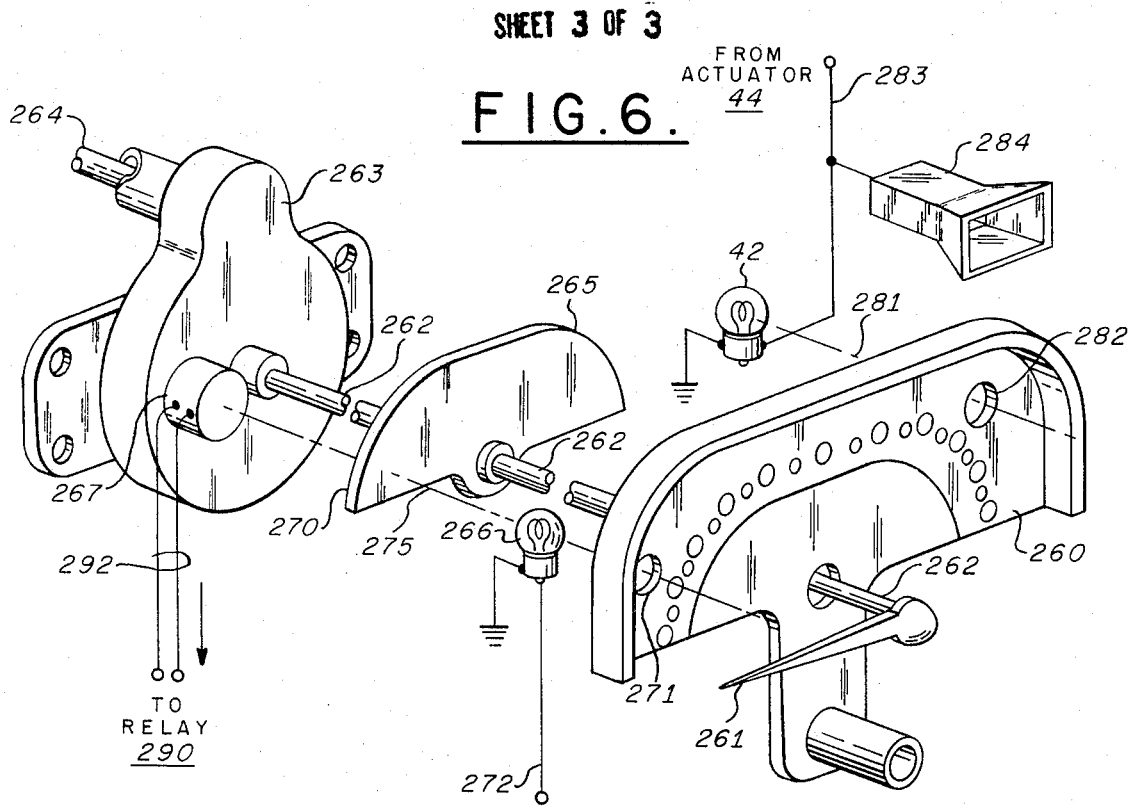
FIG. 6 is an exploded perspective view of a speed sensor used in the invention.

In order to avoid operation of actuators 44 or 46 in slowly moving traffic or during a parking maneuver, switch 20 may be removed from the engine ignition switch and may be operated as a separate manual switch. On the other hand, the function of switch 20 may be performed automatically at a relatively slow speed of the vehicle, such as at 8 miles per hour, using the apparatus of FIG. 6. While the speed sensor shown in FIG. 6 is a modified automobile speedometer, the speed sensor may take any of several forms of known devices capable of providing a zero output below a predetermined absolute vehicle speed and a finite output above that predetermined absolute speed. In the example shown in FIG. 6, the speed sensor cooperates with a conventional vehicle speedometer having a calibrated dial 260 with a pointer 261 mounted on an end of a spindle 262. It will be understood that the speedometer includes within casing 263 the usual driving permanent magnet and torqued speed cup and that spindle 262 is affixed to the speed cup for rotation thereby. It will further be understood that the speedometer drive cable 264 is geared to the drive shaft of the vehicle in the conventional manner such as to rotate the permanent magnet within casing 263 and thus to induce a clockwise rotation of spindle 262 and pointer 261 to a position indicative of vehicle speed, rotation of the speed cup and of spindle 262 being against the action of a spring within casing 263 which tends to return pointer 261 to its zero position.

A cam-shaped half disc 265 is secured to spindle 262 between casing 263 and dial 260 for rotation with spindle 262. The periphery of cam 265 passes between light source 266 and photocell 267, cutting optical path 275. Cam 265 is located on spindle 262 so that the edge 270 of the cam moves with pointer 261 in substantially the same angular relation as pointer 261. Light source 266 may be supplied with power from the vehicle battery (not shown) via terminal 272 when the object detector itself is activated, as by operating the engine ignition switch, and may be viewed by the vehicle operator through aperture 271 in dial 260. The output of photocell 267 may be applied directly or after suitable amplification to leads 292 and thence to relay 290 for operation of switch 291 of FIG. 2. From FIG. 6 it is seen that for low vehicle forward speeds, cam 265 intercepts the optical path 275 between light source 266 and photocell 267, and there is no signal input on leads 292. On the other hand, as pointer 261 progresses above a predetermined absolute speed indication, such as very few miles per hour, the edge 270 of cam 265 moves with it out of optical path 275 and photocell 267 then supplies a signal of arbitrary value to relay 290 for the closing of switch 291. It will be understood that there are other types of signal sources for generating the desired absolute speed term; for example, cam 265 can readily be employed as an element of a capacity pick-off bridge circuit designed to produce oscillations and to provide a finite rectified signal above the predetermined forward speed and to fail to oscillate, thus yielding no output, below the same predetermined forward speed.

The output of actuator 46 otherwise applied to red lamp 24 in FIG. 2 may be beneficially employed in various ways; it may be used to provide a visual or audible warning of the impending collision event or may be used to actuate conventional passenger protective devices, such as inflatable gas bag devices, for reducing the possibility of injury to a passenger whose body would otherwise strike the dash board of the vehicle. For example, in FIG. 7, the output of actuator 46 at terminal 283 may be applied to operate lamp 42 whose optical path 281 projects through an aperture 282 in the speedometer dial 260 and whose illumination may therefore be viewed by occupants of the vehicle. Preferably, a horn 284 having a strident tone is actuated by the output of actuator 46 for the same purpose.

Figure 7:
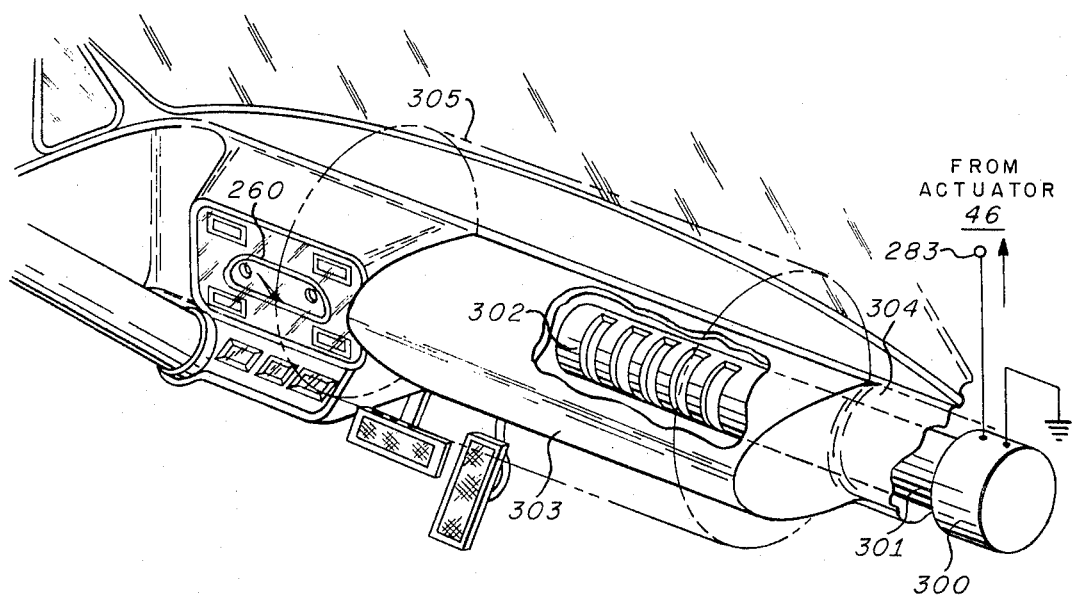
FIG. 7 is a perspective view of a passenger protective device for use with the invention.

Various protective devices may similarly be operated by actuator 46, such as the gas bag restraint device of FIG. 7. This conventional safety apparatus comprises, in general, a container or reservoir 300 of a gas producing medium and a pipe 301 with a plurality of gas diffusing slots such as slot 302. The container 300 contains a conventional actuating mechanism for controlling release of gas from the medium within container 300 so that it flows through diffuser slots 302 into the gas bag 303, causing the latter to expand.

The release of gas may be brought about by the signal applied to terminal 283 causing a detonator (not shown) to explode an explosive substance within container 300. The gas produced by the explosion forces its way out of container 300 into pipe 301 and through slots 302. Alternatively, the presence of a signal on terminal 283 may be used to cause a valve within container 300 to release gas from a high pressure storage vessel. Other arrangements are known to those skilled in the art, including those in which deflation of the gas bag after a crash can be accomplished by the manual or other operation of a suitable valve or by automatic time delayed release of the gas.

Flow of gas from diffuser slots 302 causes inflation of gas bag 303. The inflatable bag 303 is normally in a dormant collapsed or folded condition as shown at 303 in FIG. 7, and may be aesthetically contoured so as to give the general appearance of a continuation of the vehicle dash board 304. The inflatable bag 303 is secured in sealed relation about the diffuser pipe 301, and is therefore inflated to the position indicated by the dash-dot lines 305 upon release of gas from container 300. In the event of a collision, the gas bag 303 is expanded rapidly, forming a cushion between occupants facing the vehicle dash, and restraining the passengers so that they do not collide with the dash board or windscreen as the vehicle is rapidly decelerated. It will be understood by those skilled in the art that additional gas bags in other locations within either of vehicles 1 or 2 may be used to protect passengers from hitting the sides, roof, or other parts of the vehicle interior.

A preferred form of the invention will be discussed, again with reference to FIG. 1; in this preferred form, a cooperative collision avoidance system is provided, with each cooperating vehicle using two detection and warning systems of very similar character. In other words, each vehicle will have a forwardly directed transmitter-receiver system 3, 5, 6 such as that of car 1 in FIG. 1 and each will also be supplied with a rearwardly directed transmitter-receiver system 103, 105, 106, such as that of car 2 in FIG. 1. As has been previously explained, transmitter-receiver system 3, 5, 6 of car 1 has a stand-by mode and an active mode which takes over from the stand-by mode automatically when a signal 6a of predetermined amplitude is received by receiver antenna 6. It is the purpose of the transmitter-receiver system 103, 105, 106 of car 2 to augment signal 6a and to direct it particularly toward receiver antenna 6 so that maximum effectiveness of the total system is assured.

The transmitter-receiver system 103, 105, 106 of car 2 uses the same circuit as is shown in FIG. 2 for use in the front of car 1. In general, it will be preferred always to excite system 103, 105, 106 when the car engine is operating, even when the vehicle is standing still or is very slowly moving. It may be preferred, however, if actuators other than those operating warning lights are used, to supply a vehicle transmission operated switch that disables the system 103, 105, 106 of car 2 when a backing parking maneuver is being made.

The transmitter-receiver system of car 2 will, in general, be adjusted in a manner so that it normally operates in a particular way. By suitably adjusting the value of resistor 32 of FIG. 2, the system 103, 105, 106 can be made entirely dormant under normal circumstances, as when it is not being interrogated. However, when car 1 follows too closely, a train of pulse signals 5a collected by receiver antenna 6 will cause the transistor 31 of the car number 2 system to avalanche and re-enforced signal pulses 6a to be directed for collection by receiver antenna 6 of car 1. It will be clear that a warning or actuation provoking signal is now present in both cars 1 and 2 and that both operators may be alerted by means previously described to the undesirable situation. Thus, the operator of car 1 is warned to brake the forward speed of his car, while the operator of car 2 may open his engine throttle, commanding maximum acceleration of car 2 if such is permissible. Air bags or other protective devices may also or alternatively be caused to operate in car 2 as well as in car 1. A further feature of the cooperative system lies in its fail-safe characteristics. For, example, should the transmitter-receiver system 103, 105, 106 of car 2 have failed, the operating forward-viewing system 3, 5, 6 of car 1 will still function, operating by virtue of the presence of passively reflected signals from the rear of car 2. By virtue of the same inherent characteristics, the forward viewing transmitter-receiver systems operate with passively reflecting objects other than vehicles which may appear in the path of car 2, especially such as trees, high way barriers, and other ponderable objects, particularly if they have been adequately provided with passive metal reflectors by highway crews.

It will also be observed that, because of the crossed over relation of the several antennas and of beams 5a, 6a, two front systems in two cars, like system 3, 5, 6, will operate to provide protective action in the event of an impending head on collision.

It is seen that the novel collision sensor transmitter-receiver system of FIG. 1 employs wide band or wide open detector devices, receivers which will respond to any signal level in excess of a level dictated by the characteristics of the circuit associated with transistor 31. The amplitude of the received base-band pulse at the receiving antenna 6 may be, for example, about 200 millivolts in a typical operating circumstance, a value several orders of magnitude greater than the signals present in an urban environment due to conventional radiation sources, such interfering signals normally being at a microvolt level. Accordingly, although the collision sensor of FIGS. 1 and 2 essentially accepts all echo signals over a very wide pass band, it is substantially immune to interference from conventional radiation sources, including electrical noise signals.

The directive transmitter antennas 5 and 5a shown in FIG. 1 may, for instance, transmit regular trains of extremely short duration, relatively low amplitude base-band pulses. In one typical situation, these impulse-like signals have time durations of substantially 200 picoseconds and a pulse repetition frequency of the order of 10 kilohertz. However, the upper bound on the average power transmitted into space may be less than one microwatt. The spectrum of the transmitted base-band signal is spread over an extremely wide band, typically 100 megahertz to 10 gigahertz. Accordingly, the power radiated in any typical narrow communication band is far below the thermal noise threshold of a typical conventional communication receiver operating in that band. The transmitted base-band pulse is therefore incapable of interfering with the operation of standard radio communication equipment, while being remarkably adapted for use with the novel vehicle safety apparatus of the present invention.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Means for sensing distance to an energy reflecting object comprising:
   radiator transmission line means,
   receiver transmission line means,
   transistor means having collector, emitter, and base electrode means, said transistor means having a finite capacitance to ground associated with said collector electrode means, said collector electrode means being adapted for coupling to electrical power source means, impedance means coupled between said base electrode means and ground, and impedance means coupled between said emitter electrode means and ground, said radiator transmission line means being coupled to said emitter electrode means for launching a train of short-duration electromagnetic pulses into space toward said object, and said receiver transmission line means being coupled to said base electrode means for supplying thereto received short-duration electromagnetic pulses reflected by said object.

2. Apparatus as described in claim 1 wherein said finite capacitance to ground is charged by said power source means.

3. Apparatus as described in claim 2 wherein said finite capacitance to ground is periodically discharged through said transistor means for generating said short-duration electromagnetic pulses for launching into space by said radiator transmission line means.

4. Apparatus as described in claim 3 wherein said received short-duration electromagnetic pulses cause said transistor means to avalanche for producing said short-duration electromagnetic pulses for launching into space.

5. Apparatus as described in claim 4 wherein said means for sensing distance has stand-by and second modes of operation:

said stand-by mode of operation being adapted for generating short-duration electromagnetic pulses at a stand-by repetition rate, and said second mode of operation being adapted for generating short duration electromagnetic pulses at a second repetition rate greater than the said stand-by repetition rate.

6. Apparatus as described in claim 1 further including actuator circuit means coupled to said emitter electrode means responsive to the repetition frequency of said train of pulses.

7. Apparatus as described in claim 6 wherein said actuator circuit means comprises in series relation:

integrating amplifier means, and electrical current indicator means responsive to said amplifier means.

8. Apparatus as described in claim 6 wherein said actuator circuit means comprises in said series relation:

tuned circuit means, and safety means responsive to said tuned circuit means.

9. Apparatus as described in claim 1 wherein said radiator and receiver transmission line means respectively comprise:

substantially non-dispersive directive transmission line transmitter antenna means for propagating and radiating a train of electromagnetic pulses in the TEM transmission line mode, and substantially non-dispersive directive transmission line receiver antenna means for receiving and propagating a reflected electromagnetic pulse train in the TEM transmission line mode.

10. Apparatus as described in claim 1 wherein said sensing means further comprises:

means for deriving a substantial measure of the absolute forward speed of said sensor, means for converting said measure into a substantially constant finite signal only above a predetermined value of speed, and means for actuating said sensor above said predetermined value of said speed.

11. Apparatus as described in claim 1 including means coupled to said emitter electrode means for affording warning of an impending collision event.

12. Apparatus as described in claim 1 including means responsive to said transistor means for restraining vehicle occupants from impacting interior parts of said vehicle.

13. Means for sensing distance between first and second vehicles comprising:

normally active first transmitter-receiver means mounted on said first vehicle for transmitting first short-duration electromagnetic pulses toward said second vehicle, normally dormant second transmitter-receiver means mounted on said second vehicle responsive to said first short-duration electromagnetic pulses for transmitting corresponding second short-duration electromagnetic pulses toward said first vehicle, said normally active first transmitter-receiver means being responsive to said second short-duration electromagnetic pulses by transmission of said first short-duration electromagnetic pulses at an increased repetition rate inversely as a function of the distance between said first and second transmitter-receiver means, and said first and second transmitter-receiver means being adapted to supply said increased repetition rate short-duration electromagnetic pulses to actuator means mounted on both vehicles for utilization thereby.

14. Apparatus as described in claim 13 additionally including:

integrating amplifier means directly responsive to said normally active first transmitter-receiver means, and electrical current indicator means responsive to said amplifier means.

15. Apparatus as described in claim 13 wherein said actuator circuit means comprises in series relation:

tuned circuit means, and safety means responsive to said tuned circuit means.

16. Apparatus as described in claim 15 wherein said safety means comprises warning means.

17. Apparatus as described in claim 15 wherein said safety means comprises means for restraining vehicle occupants from impacting said vehicle.

18. Apparatus as described in claim 13 wherein said normally active first transmitter-receiver means comprises:

first and second transmission line antenna means, first transistor means having first, second, and third electrode means, said first transistor means having finite capacitance associated with said first electrode means, first and second impedance means coupled between said second and third electrode means, said first antenna means being coupled to said third electrode means, said second antenna means being coupled to said second electrode means, and means for supplying electrical power to said first electrode means and for thereby charging said capacitance for enabling discharge of said capacitance through said transistor means.

19. Apparatus as described in claim 18 wherein said second antenna means is adapted to couple received pulses to said second electrode means for causing said transistor to avalanche.

20. Apparatus as described in claim 18 wherein said normally dormant second transmitter-receiver means comprises:

third and fourth transmission line antenna means, second transistor means having fourth, fifth, and sixth electrode means, said second transistor means having finite capacitance associated with said fourth electrode means, third and fourth impedance means coupled between said fifth and sixth electrode means, said third antenna means being coupled to said sixth electrode means, said fourth antenna means being coupled to said fifth electrode means, and means for supplying power to said fourth electrode means and for thereby charging said fourth electrode means capacitance enabling discharge of said capacitance through said transistor means.

* * * * *